US008382881B2

(12) United States Patent
Bhasin et al.

(10) Patent No.: US 8,382,881 B2
(45) Date of Patent: Feb. 26, 2013

(54) METHOD FOR REMOVAL OF MERCURY FROM HYDROCARBON FEEDSTOCKS

(75) Inventors: Madan M. Bhasin, Charleston, WV (US); Mark K. Brayden, Baton Rouge, LA (US); Foppe Dupius, Veenendaal (NL); Peter E. Groenendijk, Hulst (NL); Seyed R. Seyedmonir, Charleston, WV (US); Michael C. Smith, Houston, TX (US); Fredrick W. Vance, Freeland, MI (US)

(73) Assignee: Dow Global Technologies LLC.

( * ) Notice: Subject to any disclaimer, the term of this patent is extended or adjusted under 35 U.S.C. 154(b) by 635 days.

(21) Appl. No.: 12/446,529

(22) PCT Filed: Nov. 19, 2007

(86) PCT No.: PCT/US2007/085081

§ 371 (c)(1),
(2), (4) Date: Feb. 8, 2010

(87) PCT Pub. No.: WO2008/064148

PCT Pub. Date: May 29, 2008

(65) Prior Publication Data

US 2010/0126909 A1 May 27, 2010

Related U.S. Application Data

(60) Provisional application No. 60/860,288, filed on Nov. 21, 2006.

(51) Int. Cl.

| | |
|---|---|
| ***B01D 53/02*** | (2006.01) |
| ***B01J 20/283*** | (2006.01) |
| ***C10L 3/00*** | (2006.01) |

(52) U.S. Cl. .......... 95/134; 208/253; 502/347; 502/348; 502/415

(58) Field of Classification Search .................. 208/113, 208/253; 95/134, 148; 502/347, 348, 415
See application file for complete search history.

(56) References Cited

U.S. PATENT DOCUMENTS

| | | | |
|---|---|---|---|
| 909,926 | A | 1/1909 | McDonald et al. |
| 4,012,337 | A | 3/1977 | Mitchell, III |
| 4,094,777 | A | 6/1978 | Sugier et al. |
| 4,500,327 | A | 2/1985 | Nishino et al. |
| 4,575,494 | A | 3/1986 | Young, Jr. et al. |
| 4,708,853 | A | 11/1987 | Matviya et al. |
| 4,761,394 | A | 8/1988 | Lauritzen |
| 4,808,738 | A | 2/1989 | Lauritzen |
| 4,820,675 | A | 4/1989 | Lauritzen |
| 4,833,261 | A | 5/1989 | Lauritzen |
| 4,874,525 | A | 10/1989 | Markova |

(Continued)

FOREIGN PATENT DOCUMENTS

| | | |
|---|---|---|
| FR | 2673191 | 2/1991 |

OTHER PUBLICATIONS

Wilhelm, S.M., "Design mercury removal systems for liquid hydrocarbons", Hydrocarbon Processing, International Edition, 1999, 78(4), 61-66, 68-71.

(Continued)

*Primary Examiner* — Walter D Griffin
*Assistant Examiner* — Renee E Robinson

(57) ABSTRACT

The invention provides a method for removing mercury from a liquid or gas hydrocarbon stream, mixtures thereof, including mixtures of liquid streams with a solid carbonaceous substance, by contacting the hydrocarbon stream with a composition comprising silver and a support material, wherein the composition as measured by ammonia chemisorption has a surface acidity in the range of 0.1-10.0 μmole of irreversible $NH_3$/g of the composition.

9 Claims, 3 Drawing Sheets

Figure 1:
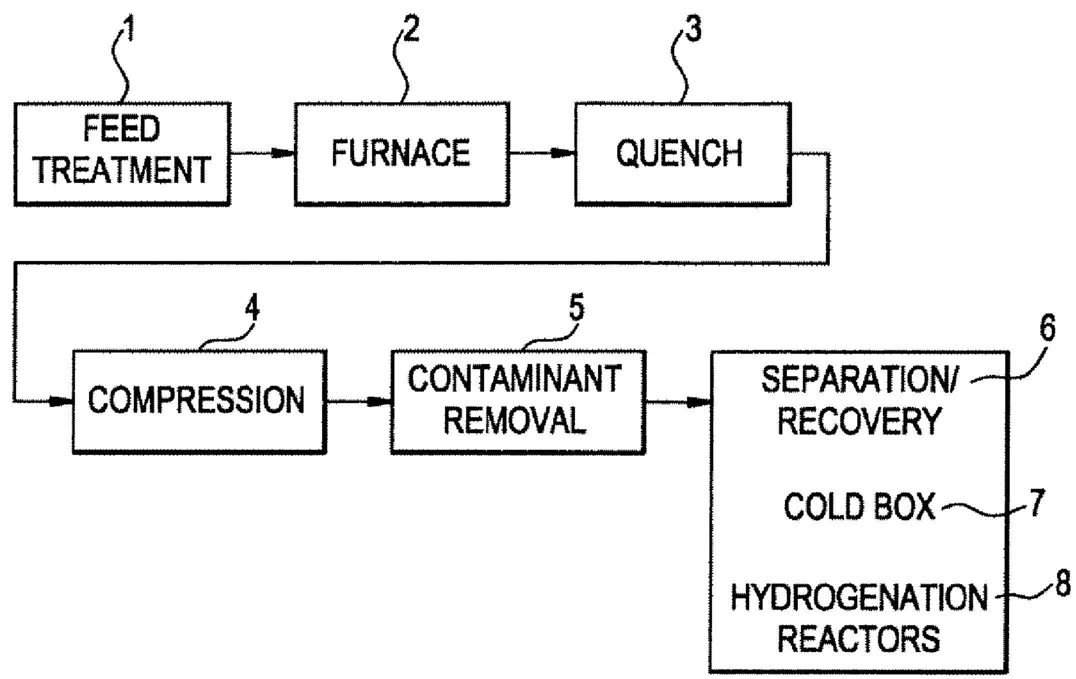

U.S. PATENT DOCUMENTS 4,902,662 A 2/1990 Toulhoat et al.
4,908,343 A 3/1990 Bhasin
4,909,926 A * 3/1990 Yan ............................... 208/253
4,911,825 A 3/1990 Roussel et al.
4,916,243 A 4/1990 Bhasin et al.
5,082,569 A 1/1992 Homeier et al.
5,102,848 A 4/1992 Soo et al.
5,187,140 A 2/1993 Thorsteinson et al.
5,336,835 A 8/1994 McNamara
5,338,444 A 8/1994 Van Buren et al.
5,504,053 A 4/1996 Chou et al.
5,856,263 A * 1/1999 Bhasin et al. ................. 502/333
6,511,938 B1 1/2003 Liu et al.
2009/0200207 A1 8/2009 Hatscher et al.

OTHER PUBLICATIONS

"Mercury Contamination in Ethylene Plants: An Overview", AIChE Spring National Meeting, Apr. 11, 2005.
Corvini et al., "Mercury Removal From Natural Gas and Liquid Streams", UOP LLC 2002.
Walhelm et al., "Conceptual Design of Mercury Removal Systems for Hydrocarbon Liquids in Gas Processing Facilities", Hydrocarbon Processing, Apr. 1999, 61-66, 68-71, 78 (4), Abstract.
Brunauer et al., "Adsorption of Gases in Multimolecular Layers", American Chemical Society, 1938, 309-316, 60.

* cited by examiner

METHOD FOR REMOVAL OF MERCURY FROM HYDROCARBON FEEDSTOCKS

CROSS REFERENCE TO RELATED APPLICATIONS

This application is a 371 of PCT/US2007/085081 filed Nov. 19, 2007, which claims the benefit of U.S. Provisional Application Ser. No. 60/860,288, filed Nov. 21, 2006.

CROSS REFERENCE TO RELATED APPLICATION

This application claims the benefit of U.S. Application Ser. No. 60/860,288, filed Nov. 21, 2006.

FIELD OF THE INVENTION

The field of the invention relates to the removal of mercury from a hydrocarbon gas or liquid stream.

BACKGROUND OF THE INVENTION

Elemental mercury and mercury compounds are trace contaminants in all types of fossil fuels (hydrocarbons); coal, petroleum (oil), and natural gas. Upon the gasification of coal, or the refinement of oil or natural gas, the resulting products can also contain mercury.

The gas and liquid hydrocarbon streams are many, and often are known by more than one name. In addition, the compositions of these gas or liquid hydrocarbon streams comprising mercury vary. Gas and oil wells are the commercial source of the hydrocarbon streams. Typical well gas comprises methane, ethane, propane, n-butane, iso-butane, iso-pentane, n-pentane and higher molecular weight hydrocarbons, as well as carbon dioxide, hydrogen sulfide, and nitrogen. The gas, and the gas associated with crude oil, may be treated at an extraction plant. The gas can be treated to produce "natural gas" or "sales gas", meaning gas which is at least 75 percent methane; Liquefied Natural Gas ("LNG"), meaning natural gas which is in liquid form at −230° F.; ethane (usually 95 percent ethane); E/P, a mixture of ethane and propane; LPG, a mixture of propane and butane; Natural Gas Liquids ("NGL"), typically ethane and higher, sold as individual liquid products; and natural gasoline/condensates, a mixture of pentanes and higher hydrocarbons.

Crude oil typically contains a mixture of hydrocarbons ranging from methane to complex multi-ring aromatic compounds, including normal paraffins, which are straight chain alkanes; iso-paraffins, which are branched chain alkanes; olefins, which are hydrocarbons which contain at least one double bond with no aromatic or cycloparaffinic rings; cycloparaffins (naphthenes) such as cyclopentane, cyclohexane; mononuclear aromatics, which are hydrocarbons which have at least one benzene ring; polynuclear aromatics, which are hydrocarbons which have two or more aromatic rings; resins such as lower molecular weight asphaltene, having molecular weights of 500-1500; asphaltenes, complex high molecular weight compounds, having molecular weights of 500-100,000; and heteroatom compounds, which are compounds containing not just carbon and hydrogen but sulfur, oxygen, nitrogen, nickel, or others.

The quality of the crude oil and the particulars of the refinery unit operations will determine the particular product distribution when the crude oil is refined. Refineries perform three major steps to transform crude oil into components: separation, such as by atmospheric distillation or vacuum distillation; conversion, such as by catalytic cracking, reforming, or visbreaking; and treatment, such as hydrotreating, desulfurization, and contaminant removal. The major sources of hydrocarbon feedstocks from a refinery are atmospheric distillation and fluidized catalytic cracker ("FCC") offgas.

In a simple refinery, the atmospheric distillation of crude oil produces light ends, which can be treated in the gas plant. In addition, naphtha and gasoline are produced, and can then be separated. The naphtha can be hydrotreated and reformed to produce gasoline. Isomerization can increase the octane rating of naphtha and gasoline. Light and heavy distillates are also products of atmospheric distillation, as are gas oil and residue. The light distillates can be hydrotreated to produce kerosene and jet fuels. The heavy distillate can be hydrotreated to produce diesel and heating oil. The gas oil and residue can be used as heavy fuel oil. In a more complex refinery, one of the products of the atmospheric distillation is atmospheric gas oil (in addition to the light and heavy distillates). The bottoms of the atmospheric column are sent to vacuum distillation where two products are produced. One product is vacuum gas oil, which can be combined with the atmospheric gas oil and further processed via catalytic cracking. The second product is the residue, which can be sent to a coker to produce gasoline and heavy fuel oil. The catalytic cracking processes produce products such as $C_4$ and lighter olefinic gases, gasoline, light cycle oil, decanted (or slurry) oil and coke. Isobutanes and olefins can be combined via alkylation to form a gasoline blending agent.

Hydrocracking can be used to convert heavy petroleum products into gasoline and/or middle distillate fuel blending stocks. Heavy fractions such as heavy gasoline can be fed to a catalytic reformer for conversion to higher value products. The lighter fraction products can be used in the production of gasoline, and as LPG. The middle distillate is usually blended for fuel oil.

Thermal cracking operations, such as coking, delayed coking, fluid coking and visebreaking can be used to increase the value of residual products from atmospheric or vacuum distillation.

Finally, coal, a solid fossil fuel containing mercury, can be gasified, for example, as part of the conversion of coal to other chemicals (methanol, olefins, etc.).

The mercury in the hydrocarbon liquid and gas streams is highly corrosive to aluminum parts, can poison catalysts, and can present industrial hygiene and environmental risks from contaminated equipment, emissions, and waste.

A range of technologies exists to deal with the removal of mercury from hydrocarbon streams. An overview of the adsorbents was made, which defined the materials generically as:

> sorbents consists of granular or pelletized material consisting of a substrate support zeolite, activated carbon, metal oxide or alumina and a reactive component Ag, KI, CuS, metal sulfide, etc. that is bonded to the support. ( . . . ) Sorbents function by reacting mercury or a mercury compound to a chemical form HgS, HgI or amalgam that is insoluble in hydrocarbon liquid and chemically inert to the components of process stream.

Wilhelm, S. M. "Design mercury removal systems for liquid hydrocarbons" *Hydrocarbon Processing, International Edition,* 1999, 78(4), 61-66, 68-71.

One category of mercury removal methods treats the feedstock. The advantage to these methods is that the mercury is removed upstream of the primary processing steps, which protects the remainder of the facility from the contamination. One example is the process of the Institut Francais du Petrole (Rueil-Malmaisson, FR) ("IFP Process") which passes a liquid hydrocarbon feedstock over a nickel on alumina bed along with hydrogen. Organometallic and ionic mercury is converted to metallic mercury. The treated feed then passes over an adsorbent material made of a metal sulfide on an adsorbent where the mercury bonds to the sulfide and is retained on the support. See, e.g., U.S. Pat. No. 4,911,825.

U.S. Pat. Nos. 4,950,408 and 5,338,444 describe removing mercury from an organic medium using ion exchange resins, with thiol groups bound to a polymeric substrate. Depending on the functional group, the resin is active for mercury or mercury and arsenic. U.S. Pat. No. 5,082,569 teaches the use of similar materials in combination with a molecular sieve impregnated with silver to trap elemental mercury. U.S. Pat. No. 5,336,835 describes a process where the mercury contaminated hydrocarbon liquid is passed over a carbon bed impregnated with a metal halide. The mercury is converted from organomercury compounds to inorganic halides and/or the reduction of non-elemental mercury compounds to elemental mercury.

Another category of methods for mercury removal treat the product streams in the recovery section. The advantage of these methods is that many of the processing steps convert the various mercury components into metallic or elemental mercury. The mercury distributes itself over different product streams (as illustrated in Table 1), and the optimal technology which works best for each specific stream and plant layout can be chosen.

For methods treating particular product streams, one group of adsorbents is based on the reactivity of elemental mercury with sulfur. The mercury forms compounds such as HgS, which is a stable solid compound that can be separated from the liquid or gaseous feed. Typically the sulfur is supplied on a solid porous adsorbent, using activated carbon or aluminum oxide as carrier or as metal sulfide. See U.S. Pat. Nos. 4,500,327 and 4,708,853 (sulfur impregnated activated carbon beds and carbon molecular sieves). Calgon Carbon Corporation, Pittsburgh, Pa. describes using sulfur in its HGR® activated carbon support. Mersorb® mercury adsorbent, from Selective Adsorption Associates, Inc., Langhorne, Pa., is described as a mercury adsorbent on activated carbon.

Metal sulfides are described as being used on alumina to treat liquid and gas streams. See U.S. Pat. No. 4,094,777. Puraspec 1156, Puraspec 1157, and Puraspec 5156 (all from Johnson Matthey Catalysts, Houston, Tex.) are said to treat gas streams with pre-sulfided mixed oxides to remove mercury (Puraspec 1156), to treat gas streams to remove both hydrogen sulfide and mercury from by reaction with spherical mixed oxides (Puraspec 1157), and to remove mercury from liquid hydrocarbon steams using a spherical mixed metal sulfide absorbent (Puraspec 5156). Mechanical strength is an issue with these materials, as they are generally mostly mixed oxides with some binder, not supported on a carrier.

Another group of adsorbents is based on the affinity of mercury to form an amalgam. U.S. Pat. No. 4,874,525 describes reacting mercury with another metal, such as silver, which has been bonded to a support such as a molecular sieve. This approach can treat either liquid or gas streams. HgSIV, offered by UOP (DesPlaines, Ill., USA) is described as using silver on the molecular sieve to remove mercury and water.

U.S. Pat. No. 4,909,926 describes removing mercury from condensate using a high surface area support and a reactive adsorbent on the support, where the reactive adsorbent is reactive to mercury. The reactive adsorbent may be metallic silver and the support high surface area alumina.

Sud-Chemie (Munich, Germany) markets a product T-2552, comprised of silver on gamma-alumina for use in removing mercury from gas feedstocks. The material is a standard adsorbent which is applied in removal of contaminants both in the ethylene plant as well as in the ethylene product.

An example of one location where mercury removal is important is in ethylene plants. In an ethylene plant, a steam cracker (a furnace) breaks ("cracks") the saturated hydrocarbons down into smaller, often unsaturated hydrocarbons. To accomplish this, the feed is diluted with steam in coiled tubes and then briefly heated in a furnace. Typically, the coil outlet temperature is between about 800° C. and about 820° C., but the temperatures may vary. Depending on the design of the furnace, the residence time can be in milliseconds, but in general, the residence time is less than about 1 second. The composition of the cracked gas depends on the composition of the feed, the hydrocarbon to steam ratio, the cracking temperature, and furnace residence time. Light hydrocarbon feeds (such as ethane, LPGs or light naphthas) give product streams rich in the lighter alkenes, including ethylene, propylene, and butadiene. Heavier hydrocarbon feeds give some of these, but also give products rich in aromatic hydrocarbons and hydrocarbons suitable for inclusion in gasoline or fuel oil. A higher cracking temperature favors the production of ethylene and benzene, whereas a lower cracking temperature produces relatively higher amounts of propylene, C4-hydrocarbons and liquid products. *Pyrolysis: Theory and Industrial Practice*, Lyle F. Albright, et al., Ed., 1983, p. 76.

Since the product composition is so varied, the layout of the operations downstream of the furnace area will differ as well, but there is a generic design that matches most ethylene plants. This design is shown in FIG. 1, which identifies five different unit operations. In the feed treatment operation (1) contaminants can be removed from the feed before they enter the plant. As examples of feed treatment operations, ethane crackers may have a $CO_2$ removal unit, and liquid crackers may have water/oil separators. In the furnace operation (2), the feed is typically heated to about 820-850° C. at low pressure to cause the hydrocarbon molecules to crack into fragments and to form ethylene, propylene and other molecules. Following the furnace operation is the quench operation (3), where the hot cracked gas is cooled and partially condensed. After quenching, the cooled and partially condensed cracked gas is sent to the compression operation (4), where it is pressurized. There may be more than one compression operation, which may or may not be immediately sequential. A contaminant removal operation (5) is performed after or between stages of compression. In the contaminant removal operation, $CO_2$ and $H_2S$ are removed, usually through a wash with a caustic solvent. Water is also removed, usually with activated aluminas or molecular sieves. The product is then sent to the separation/recovery operation (6), where it is further treated through a series of distillations to produce purified monomers like ethylene and propylene. The separation/recovery operations typically include one or more hydrogenation reactors (8) to reduce the concentration of acetylenic components. The separation/recovery operation also comprises a "cold box" (7), where the gas temperatures are reduced to very low levels to allow separation of the light molecules.

The cracked gas from the furnace operation also includes undesirable organic impurities such as carbonyls (such as aldehydes and ketones), and dienes such as cyclopentadiene. In addition, the mercury components in the feed are converted in the furnace operation into mercury, including elemental mercury, which will remain as a volatilized metal in the cracked gas. If the mercury is left in the cracked gas it will distribute over different streams in the recovery operation, as illustrated in Table 1.

TABLE 1

| Olefins Unit Mercury Distribution | |
|---|---|
| Stream | Distribution (Relative %) |
| Tail Gas | 2 |
| Ethylene Product | 8 |
| Ethane Recycle | 2 |
| Propylene Product | 1 |
| Methylacetylene/ Propadiene Catalyst | 19 |
| Propane Recycle | 1 |
| Butanes/Butylenes | 53 |
| Pyrolysis Gasoline | 1 |
| Unaccounted | Balance |

Mercury contamination in ethylene plants: an overview. Reid, et al., USA. AIChE Spring National Meeting, Conference Proceedings, Atlanta, Ga., United States, Apr. 10-14, 2005 (2005).

SUMMARY OF THE INVENTION

There remains a need in the chemical industry for improved methods of removing mercury contaminates from hydrocarbon feedstocks. The present invention comprises a method for the removal of mercury from liquid and gas hydrocarbon streams and from mixtures of the same. The method comprises contacting the stream with a composition comprising (a) a solid, porous, refractory support material having a surface acidity in the range of 0.1-10.0 μmole of irreversible $NH_3$/g of support as measured by ammonia chemisorption; and (b) silver.

DETAILED DESCRIPTION OF THE DRAWINGS

FIG. 1 schematically depicts the generic layout of an ethylene plant of the prior art.

Figure 2:
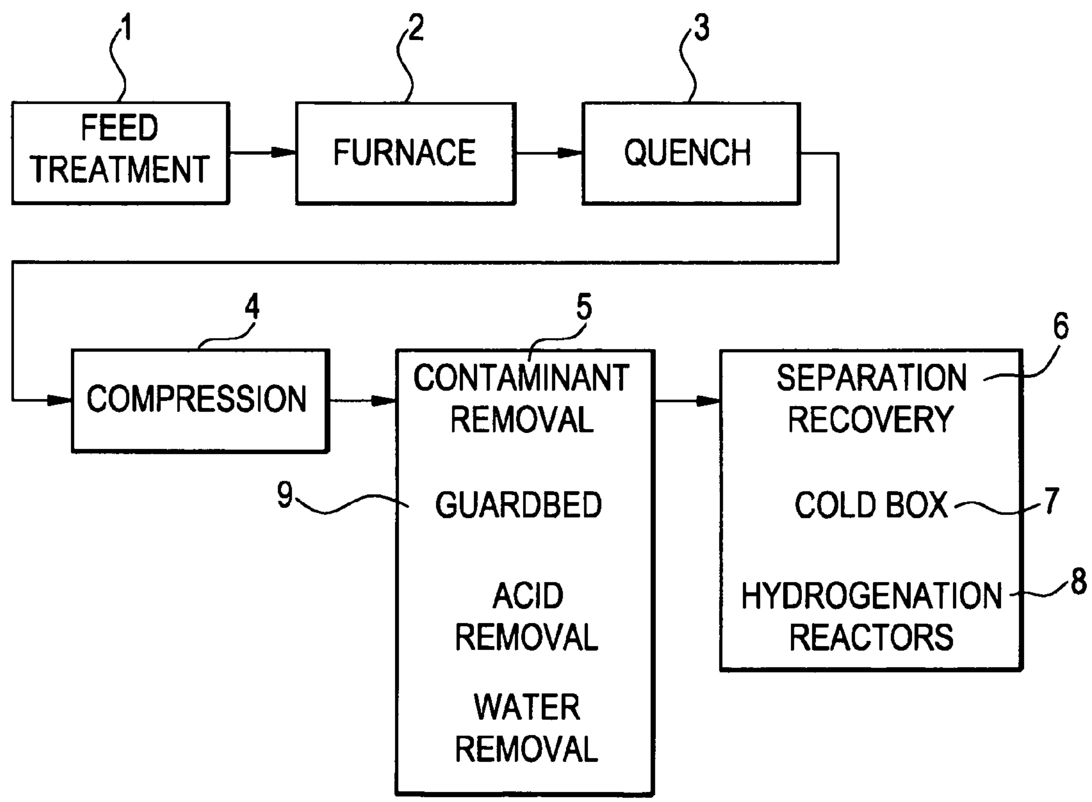

FIG. 2 schematically depicts the generic layout of an ethylene plant modified to use the composition of the present invention.

Figure 3:
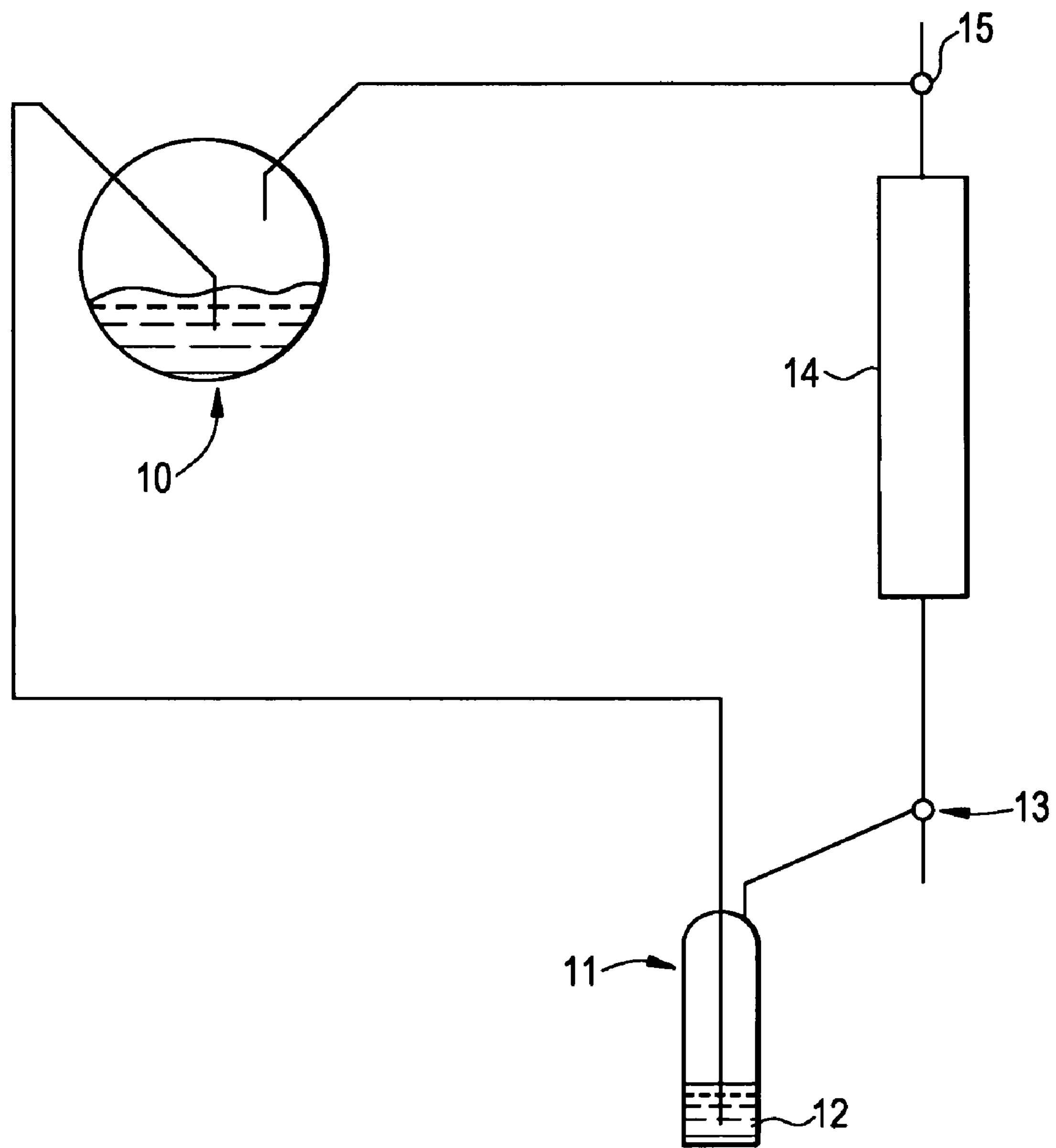

FIG. 3 schematically depicts a generic set-up of equipment and sampling points in a lab scale process to test mercury removal from a liquid hydrocarbon stream.

DETAILED DESCRIPTION OF THE INVENTION

The method of mercury removal of the present invention is applicable to hydrocarbon gas and liquid streams, and to mixtures of them and to mixtures of liquid streams with a solid carbonaceous material such as coke, in a slurry. By "hydrocarbon gas and liquid streams", we mean the crude hydrocarbon streams from gas and oil wells as well as such streams after they have been further processed or refined. We also include hydrocarbon streams derived from coal. (We do not include the streams of contaminants removed from hydrocarbon streams, such as carbon dioxide, hydrogen sulfide, water or nitrogen.)

As mentioned above, the composition of the hydrocarbon stream to be treated for mercury removal (components and the relative amounts of each) will vary. For exemplary purposes, and not by way of limitation, components of a hydrocarbon cracker product gas stream generally include mercury (including elemental mercury) (0-50 ug/m3), carbon monoxide (0-0.3 vol %), hydrogen (8-20 vol %), methane (20-40 vol %), acetylene (0.3-1.5 vol %), ethylene (25-40 vol %), ethane (3-15 vol %), methylacetylene (0.1-0.5 vol %), 1,3 propadiene (0.1-0.4 vol %), propylene (5-20 vol %) and propane (0.2-5 vol %). Additionally it may contain components like 1,3-butadiene, butene, 2-methylpropane, n-butane, cyclopentadiene, $C_5$ hydrocarbons, benzene and various $C_6$ to $C_{10}$ hydrocarbons in concentrations up to 5 vol %, and components like acetalaldehyde, acetone and thiophene up to 100 wt ppm.

The method of the present invention comprises contacting the hydrocarbon gas or liquid stream with a composition comprising silver and a support material. The composition has a surface acidity in the range of 0.1-10.0, preferably 0.2-5, and more preferably 0.2 to 2.0 μmole of irreversible $NH_3$/g of composition as measured by ammonia chemisorption.

In one embodiment, the support material has a surface acidity in the range of 0.1-10.0 μmole of irreversible $NH_3$/g of support material as measured by ammonia chemisorption. Preferably, for the support material, the range of surface acidity is less than or equal to 5, and more preferably less than or equal to 2. In another embodiment, the support material comprises alpha-alumina, SiC, $SiO_2$, Zirconia ($ZrO_2$), $CeO_2$, $Pr_6O_{11}$, $Ga_2O_3$, $TiO_2$, ZnO, MgO, CaO, and/or carbon. In a preferred embodiment, the support material comprises alpha-alumina. In a more preferred embodiment, the support material comprises alpha-alumina with a range of surface acidity of less than or equal to 5, and more preferably less than or equal to 2.

For processed feedstocks, such as cracked feedstocks, compositions and support materials having surface acidity in the range of less than or equal to 5 are less likely to react with the organic impurities in the feedstock to form unwanted by-products. Accordingly, in a first aspect, the composition has a surface acidity sufficient to reduce polymer and/or oligomer formation from dienes in the feedstock as compared to a composition with a surface acidity greater than 10.0 μmole of irreversible $NH_3$/g of composition as measured by ammonia chemisorption. In a second aspect, the composition has a surface acidity sufficient to reduce water formation from a condensation reaction of oxygenated by-products in the feed stream as compared to a composition with a surface acidity greater than 10.0 μmole of irreversible $NH_3$/g of support material as measured by ammonia chemisorption. In a third aspect, the composition has a surface acidity sufficient to reduce oligomer formation from a reaction of oxygenated by-products in the feed stream as compared to a composition with a surface acidity greater than 10.0 μmole of irreversible $NH_3$/g of composition material as measured by ammonia chemisorption. Thus, the composition used to remove the mercury preferably does not react with, or only minimally reacts with, the organic impurities to produce unwanted by-products such as water and oligomers. Thus, the method of the present invention accomplishes mercury removal from the hydrocarbon stream with minimal reaction of the organic impurities to produce unwanted by-products such as water and oligomers.

Accordingly, in one embodiment, the hydrocarbon stream is gas from a hydrocarbon cracker, and the stream comprises mercury and further comprises olefins, oxygenated by-products, dienes, and hydrocarbons other than dienes. In a second embodiment, the hydrocarbon stream is gas from the gasification of coal. In a third embodiment, the hydrocarbon stream is liquid from one or more of LPGs, butane, naphtha, benzene, mixed xylenes, premium and regular unleaded gasoline, kerosene, jet fuel/diesel, residual fuel oil, and mixtures of any two or more of the foregoing, and mixtures of any one or more of the foregoing with a solid carbonaceous material such as coke.

Generally, suitable alpha alumina support materials have a specific surface area as measured by the B.E.T. method of greater than about 0.1 $m^2/g$, generally in the range of from about 0.2 $m^2/g$ to about 20 $m^2/g$. Preferably, the specific surface area of such support materials as measured by the B.E.T. method is in the range of from about 0.7 to about 10 $m^2/g$, and more preferably the specific surface area of the support material as measured by the B.E.T. method is in the range of from about 0.8 to about 1.6 $m^2/g$. The B.E.T. method for determining specific surface area is described in detail in Brunauer, S., Emmet, P. and Teller, E. J. Am. Chem. Soc., 60, 309-16 (1938). These support materials have a mercury pore volume as measured by conventional porosimetry techniques of at least about 0.2 cc/g, generally in the range of from about 0.5 to about 2.0 cc/g, preferably greater than about 0.55 cc/g, and most preferably from about 0.6 to about 0.8 cc/g.

The support material employed in these compositions may be selected from the large number of porous refractory support materials which are considered suitable as supports for olefin oxide catalysts; such support material is relatively inert in the presence of the feeds, products and reaction conditions. The chemical composition of the support material is not narrowly critical, provided that the support material and/or the composition have the surface acidity described. Support materials may be composed, for example, of alpha-alumina, SiC, $SiO_2$, Zirconia ($ZrO_2$), $CeO_2$, $Pr_6O_{11}$, $Ga_2O_3$, $TiO_2$, ZnO, MgO, CaO, and/or carbon. The preferred support materials are alpha-alumina particles, often bonded together by a bonding agent, sometimes by self-binding, or without binders, and have a very high purity, i.e., at least 98 wt. % alpha-alumina, or they may be of lower purity, i.e., about 80 wt. % alpha-alumina. In all instances, particularly for the lower purity support materials, the balance of materials (the "impurities") should not contribute to higher surface acidity and the overall surface acidity needs to be in the described range. A wide variety of such support materials are commercially available. Alumina support materials are commercially available from various suppliers such as Sud-Chemie, Louisville, Ky., and St Gobain Norpro, Akron, Ohio.

Suitable shapes of support materials include, but are not limited to, pills, chunks, tablets, pieces, spheres, pellets, tubes, wagon wheels, toroids having star shaped inner and/or outer surfaces, cylinders, hollow cylinders, amphora, amorphous, rings, Raschig rings, honeycombs, monoliths, saddles, cross-partitioned hollow cylinders (e.g. having at least one partition extending between walls), cylinders having gas channels from side wall to side wall, cylinders having two or more gas channels, and ribbed or finned structures. While the cylinders are often circular, other cross-sections, such as oval, hexagonal, quadrilateral, trilateral may be useful. The preferred shape and dimensions will depend on the reactor type and other factors such as desired pressure drop and mechanical integrity of the composition.

Median pore diameters for the above-described support materials range from about 1 to 50 microns, a more preferred range being from about 1 to 25 microns, and most preferred in the range of from about 3 to about 20 microns. The support materials may have monomodal, bimodal or multimodal pore distributions.

In one embodiment, at least about 40% of pore volume is present in pores between about 10 and 100 microns in diameter as measured by mercury porosimetry.

The amount of silver on the support material is at least about 1, preferably at least about 5, more preferably at least about 7, still more preferably at least about 10, or more preferably at least about 15 weight percent as compared to the overall weight of the composition. In making such a composition, the support material is typically impregnated (one or more times) with one or more silver compound solutions sufficient to allow the silver to be supported on the support material in an amount greater than about 1 percent, greater than about 5 percent, greater than about 7 percent, greater than about 10 percent, preferably, or greater than about 15 percent based on the weight of the composition. Typically, the amount of silver on the support material is less than about 70 percent, preferably, less than about 50 percent, and more preferably, less than about 40 percent by weight, based on the weight of the composition.

In one embodiment, the support material has a surface area, porosity, and pore size distribution sufficient to accommodate silver loadings in the range of about 5-40 wt % while maximizing dispersion. The capacity of the composition to remove mercury depends upon the amount of silver and upon the specific surface area of the silver.

While the present invention should be understood as being unconstrained by any particular theory, it is believed that the silver acts as an adsorbent and absorbent with regard to the elemental mercury present. The mercury adsorbs to the surface and can also migrate into the silver to form an amalgam with the silver. It is thought that the absorption occurs rapidly while the amalgamation occurs more slowly.

The silver solution used to impregnate the support material is preferably comprised of a silver compound in a solvent or complexing/solubilizing agent. Silver solutions used for example to impregnate supports in the production of ethylene oxide catalysts are useful. See Thorsteinson et al., U.S. Pat. No. 5,187,140, Liu, et al., U.S. Pat. No. 6,511,938, Chou et al., U.S. Pat. No. 5,504,053, Soo, et al., U.S. Pat. No. 5,102,848, Bhasin, et al., U.S. Pat. Nos. 4,916,243, 4,908,343, and 5,059,481, and Lauritzen, U.S. Pat. Nos. 4,761,394, 4,766,105, 4,808,738, 4,820,675, and 4,833,261, all incorporated herein by reference. The particular silver compound employed may be chosen, for example, from among silver complexes, silver nitrate, silver oxide, or silver carboxylates, such as silver acetate, oxalate, citrate, phthalate, lactate, propionate, butyrate and higher fatty acid salts. Silver oxide complexed with amines is another preferred form of silver for use in the present invention.

A wide variety of solvents or complexing/solubilizing agents may be employed to solubilize silver to the desired concentration in the impregnating medium. Among those disclosed as being suitable for this purpose are lactic acid; ammonia; alcohols, such as ethylene glycol; and amines and aqueous mixtures of amines.

For example, silver oxide ($Ag_2O$) can be dissolved in a solution of oxalic acid and ethylenediamine to an extent of approximately 30 percent by weight. The number of impregnations used to achieve a desired silver concentration depends on factors such as the silver concentration in the impregnation solution and the porosity of the support. Vacuum impregnation of such a solution onto a support material of approximately 0.7 $cm^3/g$ porosity typically results in a composition containing approximately 20 percent by weight of silver based on the entire weight of the composition. Accordingly, using this type of preparation, if it is desired to obtain an composition having a silver loading of greater than about 25 or 30 percent, and more, it would generally be necessary to subject the support material to at least two or more sequential impregnations of such silver solution until the desired amount of silver is deposited on the support material. There are many combinations in which such impregnations to reach higher silver loadings can be achieved. In some instances, the concentration of the silver salt is higher in the latter impregnation solutions than in the first. In other instances, approximately equal amounts of silver are deposited during each impregnation. Often, to effect equal deposition in each impregnation, the silver concentration in the subsequent impregnation solutions may need to be greater than that in the initial impregnation solutions. In further instances, a greater amount of silver is deposited on the support material in the initial impregnation than that deposited in subsequent impregnations. Each of the impregnations may be followed by roasting or other procedures to remove the volatile solvent and render the silver insoluble.

Although silver particle size in the composition is important, the range is not narrow. A suitable silver particle size can be in the range of from about 10 to about 10,000 angstroms in size. A preferred silver particle size ranges from greater than about 100 to less than about 5,000 angstroms in diameter. More preferably, the silver particle size is about 200 to about 3,000 A.

It is desirable that the silver be relatively uniformly dispersed within, throughout, and/or on the support material. In some embodiments, it can be desirable that the silver distribution is directed to a specific location in the pill, such as the egg shell model. Impregnation of the support material is generally the preferred technique for silver deposition, because it utilizes silver more efficiently than coating procedures, the latter being generally unable to effect substantial silver deposition onto the interior surfaces of the support material. In addition, coated compositions are more susceptible to silver loss by mechanical abrasion. Alternatively, incipient wetness technique can be used.

A preferred procedure for depositing the silver component comprises a one-step impregnation. The support material is impregnated with a solution comprising a solvent or solubilizing agent and a silver salt in an amount sufficient to deposit the desired weight of silver upon the support material. Thereafter, the impregnated support material is calcined or roasted under air (or other atmospheres, such as in nitrogen, carbon dioxide, hydrogen, helium, steam and/or mixtures thereof) at a temperature ranging from about 200° C. to about 600° C. and at atmospheric pressure (or other pressures) for a time ranging from about 0.01 to about 12 hours. The calcining or roasting can take place in an oven or on a moving belt. Prior to the calcination, optionally, the impregnated support material may be dried in an oven to remove at least some of the solvent. The impregnation may be accomplished in more than one step. For example, in a second step, the silver-impregnated support material is impregnated with a solution containing additional silver compound. Thereafter, the support material now impregnated with silver is calcined or roasted as described above. In the event that sufficient reduction of silver does not occur during final calcination, then additional reduction steps, for example, treatment in a reducing atmosphere, such as with hydrogen and/or a hydrocarbon stream, or with carbon monoxide, at a sufficiently high temperature can be used.

In one embodiment, the composition comprises a catalyst capable of being or having been used to produce ethylene oxide, containing both silver and one or more promoters. The sequence of impregnating or depositing the surfaces of the support with silver and promoters is optional. The promoters can be added prior to, concurrent with, or subsequent to the deposition of the silver. Examples of these catalysts are described in Thorsteinson et al., U.S. Pat. No. 5,187,140, particularly at columns 11 through 15 (alkali metal and/or alkaline earth metals, fluorides and chlorides, oxyanions of the elements other than oxygen having an atomic number of 5 to 83 of Groups 3b to 7a, inclusive, of the Period Table of the elements, and most preferably, one or more the anions of nitrogen, sulfur, manganese, tantalum, molybdenum, tungsten, and rhenium), Liu, et al., U.S. Pat. No. 6,511,938 (cobalt), Chou et al., U.S. Pat. No. 5,504,053 (manganese), Soo, et al., U.S. Pat. No. 5,102,848 (cation selected from at least one member of the group of lithium, sodium, potassium, rubidium, cesium, and barium, and anion comprising (a) sulfate, (b) fluoride, and (c) at least one member of the group of anions of elements having atomic numbers 21 to 74, inclusive, selected from Groups 3b to 6b, inclusive, of the Periodic Table of Elements) Bhasin, et al., U.S. Pat. No. 4,916,243 (synergistic combination of cesium, and at least one other alkali metal selected from the group consisting of lithium, sodium, potassium, and rubidium), U.S. Pat. No. 4,908,343 (cesium salt of an oxyanion of an element selected from Groups 3 through 7B, inclusive, of the Periodic Table of the Elements), and U.S. Pat. No. 5,059,481 ((a) mixture of (i) cesium salts, at least one of which is a cesium salt in which the anion thereof is an oxyanion of an element having an atomic number of 21 to 75 and being from Groups 3b through 7b, inclusive, of the Periodic Table of the Elements and (ii) at least one of an alkali metal salt of lithium, sodium potassium and rubidium and an alkaline earth metal salt, in which the anions of such salts are halides of atomic numbers of 9 to 53, inclusive, and oxyanions of elements other than the oxygen therein having an atomic number of 7 or 15 to 83, inclusive, and selected from Groups 3a to 7a, inclusive and 3b through 7b, inclusive, of the Periodic Table of the Elements; (b) mixture of (i) a cesium salt of an oxyanion of an element selected from Groups 3b through 7b, inclusive, of the Periodic Table of the Elements; and (ii) an alkali metal salt of lithium, sodium, potassium and rubidium, in which the anions of such salts are oxyanions of elements other than the oxygen therein having an atomic number of 15 or 83 and sleeted from Groups 3a to 7a, inclusive and 3b through 7b, inclusive, of the Periodic Table of the Elements), and Lauritzen, U.S. Pat. No. 4,761,394 (alkali metal and rhenium), U.S. Pat. No. 4,766,105 (alkali metal, rhenium, and rhenium co-promoter selected from sulfur, molybdenum, tungsten, chromium and mixtures thereof, U.S. Pat. No. 4,820,675 (cesium plus lithium, rhenium, and rhenium co-promoter selected from sulfur, molybdenum, tungsten, chromium and mixtures thereof), all incorporated herein by reference.

In another embodiment, the composition comprises such a catalyst which has been treated to remove at least some of one or more of the promoters. Removal of at least some of one or more of the promoters would most usually make sense in the case of using a "spent" ethylene oxide catalyst. In addition to removing some of one or more of the promoters, some of one or more other impurities, such as halogens, may also be removed.

The silver may be regenerated by the removal of the mercury. See: Mercury removal from natural gas and liquid streams, Stiltner, Annual Convention Proceedings—Gas Processors Association (2002), 81st 90-99.

The method can be used in various locations, as known to those of skill in the art.

In an ethylene plant, for example, the composition can be used in a guard bed. Alternatives to a separate guard bed include an over layer of the composition on another catalyst or absorbent/adsorbent, or as part of a multi-layered bed. As known to those skilled in the art, the bed is designed based upon the flow, temperature, and pressure of the hydrocarbon stream, at times a cracked gas. The guard bed is such that the so-called "empty-bed-contact time" is between about 0.2 to 5 about 20 seconds. Referring to FIG. 2, in one embodiment, the composition is added to a guard bed (9), which is located in the ethylene plant in the contaminant removal operation (5), upstream of the cold box (7) and the hydrogenation reactors (8). The contaminant removal operation (5) of FIG. 2 also depicts the acid removal and water removal operations. The cracked gas is fed to the guard bed containing a composition more fully described below.

The following examples are set forth for the purpose of illustrating the invention; but these examples are not intended to limit the invention in any manner. One skilled in the art will recognize a variety of substitutions and modifications of the examples that will fall within the scope of the invention.

Unless otherwise specified in the examples below:

(1) Water concentrations are determined using a vibrating quartz crystal moisture analyzer, AMETEK 5000 moisture analyzer (Ametek Process and Analytical Instruments, Ametek GmbH, Meerbusch, Germany). A vibrating quartz crystal moisture sensor is a device for detecting the presence of moisture in a sample gas stream by dividing the stream into two portions, one of which is dried, then alternately passing the two streams across the face of a hygroscopically sensitized quartz crystal whose wet and dry vibrational frequencies are continuously monitored and compared to the frequency of an uncoated sealed reference crystal.

(2) Mercury concentrations are determined by passing a known volume of gas over a gold/platinum gauze which traps the elemental mercury from the gas phase. The mercury is then desorbed under an argon flow at elevated temperature in a Perkin Elmer FIAS 200 (Perkin-Elmer, Inc., Wellesley, Mass. USA) and the amount of mercury is then quantified by atomic absorption spectroscopy using a Perkin Elmer AAnalyst 700 (Perkin-Elmer, Inc., Wellesley, Mass. USA) atomic absorption spectroscope. The concentration of the mercury is then calculated by dividing the amount of mercury by the volume of gas which is sampled.

(3) Surface acidity measurements by ammonia chemisorption are done using either a conventional glass vacuum/volumetric adsorption system or a Micromeritics Model 2010 instrument equipped with chemisorption capabilities. Approximately 2 grams of sample are used, although weights vary between 1-18 grams. Whenever applicable, sample pills are crushed to several smaller pieces and/or a 20/40 mesh is used. Samples are briefly evacuated and then exposed to flowing He (30 cc/min) at atmospheric pressure and ambient temperature. The temperature of the samples is raised (10° C./min) to 200° C. in flowing He and is held for 75 minutes. The samples are then evacuated at 200° C. for 15 min. and further cool to 100° C. under vacuum. Ammonia adsorption isotherms (4 points) are then measured at 100° C. over a typical range of 10-25 Torr. Any reversible $NH_3$ adsorption is determined by evacuating the samples at 100° C. for 15-30 minutes, then repeating the $NH_3$ adsorption isotherm. Irreversibly adsorbed ammonia (reported values for acidity) is obtained from the difference of these two isotherms at approximately 10 Torr. In some cases the irreversibly adsorbed ammonia is determined from subtracting adsorption amounts measured at a single pressure of approximately 10 Torr rather than measuring 4 point isotherms. The equilibration time during adsorption measurements is typically 45-60 minutes at each pressure. In all cases the volume of irreversibly adsorbed $NH_3$ is calculated at STP and results are reported as μmole/g of sample.

(4) Silver surface area measurements are done using oxygen ($O_2$) chemisorption-carbon monoxide (CO) titration on an automated pulse chemisorption analyzer. Pulse chemisorption is an adsorption technique (non-equilibrium) carried out under isothermal conditions, and measures the volume of gas adsorbed on a metal surface to quantify the exposed surface area and allow calculations of an average crystallite size. Approximately 1 g of sample (10/14 mesh size) is used in each measurement. Samples are pretreated in 30 cc/min flowing helium (He) at 170° C. for 30 minutes prior to analysis. The samples are then oxidized by a continuous flow (30 cc/min) of $O_2$ (UHP grade) at 170° C. for 2 hours followed by purging in flowing He for 1-2 minutes at 170° C., and evacuation to approximately 20 m Torr for 1-2 min. The oxygen on the silver surface is then titrated by pulses of CO (UHP grade) into a flow of 30 cc/min He (UHP grade). Pulsed $O_2$ is then used to re-oxidize the silver surface. The pulse volume (0.1 cc Supelco injection loop) is chosen so that a few pulses will be completely consumed. Knowing the pulse volume using a thermal conductivity detector (TCD) and the number of pulses consumed (CO reacted and newly adsorbed $O_2$ on the metal surface), including fraction of pulses, the amount of gas consumed (μmol/g of sample) can be calculated. The amounts of newly adsorbed oxygen (after CO pulses) are used to calculate Ag surface areas using the stoichiometry of one oxygen atom per each exposed silver atom. The dispersion (D) is defined as the ratio of the exposed silver atoms on the surface of crystallites to total of silver atoms in the sample and is calculated using the equation: $D=(2.157\times10^{-4})^{U}/W$, where, U=oxygen uptake in μmoles/g (STP) and W=g Ag/g sample. Average crystallite sizes (d) can then be calculated from the equation d=13.42/D, where D=dispersion.

Example 1

Comparative Example, not According to the Present Invention

A composition with six weight percent silver (as reported by the vendor) on gamma-alumina in the shape of spheres between 2 and 4 mm in diameter (T-2552A, Sud Chemie, Munich, Germany) is installed in a vessel and reduced at 200° C. and 4 bar pressure with a mixture of 8 vol percent hydrogen in methane. The is cooled down under the same gas flow, and at ambient temperature, using the same gas mixture of 8 vol percent hydrogen in methane, the pressure is increased to 6 bar and the supply of reducing gas is stopped. The bed is then pressurized and brought on stream using cracked gas. The average composition of this cracked gas includes carbon monoxide (0.07 vol %), hydrogen (13 vol %), methane (27 vol %), acetylene (0.5 vol %), ethylene (33 vol %), ethane (4 vol %), methylacetylene (0.35 vol %), 1,3 propadiene (0.25 vol %), propylene (13 vol %), propane (0.4 vol %), 1,3-butadiene (3 vol %), butene (3 vol %), n-butane (0.5 vol %), cyclopentadiene (0.4 vol %) and 15 wt ppm acetone. The process operates at 12 bar and 15° C. The residence time of the cracked gas in the bed is about 10 seconds. The performance is monitored for 4 weeks, after which the run is discontinued. During that time, the mercury removal by the bed is functioning properly with an inlet concentration up to 5 ug/m3 and less than 0.02 ug/m3 in the outlet. The inlet water concentration at the guard bed is measured and found to be less than 0.1 wt ppm. However, the water content of the outlet is between 4 and 6 wt ppm, which results in several incidents where the downstream ethylene/ethane splitter (in the separation/recovery operation) becomes blocked due to gas hydrate formation. The acetone concentration drops across the bed from 15 down to 5 wt ppm.

Example 2

Comparative Example, not According to the Present Invention

A second run of the same used in Example 1, using the same vessel, but using half the amount of the and adding a zeolite molecular sieve in a 3:1 ratio to the, is done using the same pretreatment and running at the same operating conditions, with the same cracked gas composition, except that residence time in the guard bed is about 5 seconds and the residence time in the molecular sieve is about 15 seconds. The inlet and outlet water concentration of the guard bed is measured and both found to be less than 0.10 wt ppm. This time the bed outlet is additionally monitored for components with a high boiling temperature. In the outlet dimethylfulvene and the oligomers of dimethylfulvene with cyclopentadiene are found. So much heavy components are formed that a separate liquid phase is created in the guard bed. The liquid is in equilibrium with the gas phase and therefore consists of ±40% of C4 components like butadiene and 1-butene, 25% of C3 components and lighter like propylene and ethylene, and 20% of C5 components like isoprene and cyclopentadiene. The heavy components with a normal boiling point higher than 140° C. account for 5-10% of the liquid and include components like dicyclopentadiene, dimethylfulvene and oligomers of dimethylfulvene with cyclopentadiene. The heavy components end up in a downstream distillation tower where they are trapped in the polymer in the hot section of the reboilers.

Example 3

Comparative Example, not According to the Present Invention

Before the run is started, the amount of mercury in the feed is about 34 ug/m$^3$. During 3 weeks of operation, the mercury concentration rises to 45 ug/m$^3$. A sulfur on activated carbon adsorbent in the shape of pellets having 4.5 mm diameter (HGR-P® impregnated granular activated carbon for mercury removal, Calgon Carbon Corporation, Pittsburgh Pa. USA) is loaded in the vessel described in Example 1 and dried through vacuum drying. A methane flow is started through the bed and to this gas the cracked gas described in Example 1 is added in increasing amount to condition the activated carbon to the hydrocarbons in the process stream. The conditioning acclimates the activated carbon to the hydrocarbon species, thus minimizing the heat generation and potential damage to the composition due to adsorption of contaminant on the carbon surface. Once the bed is fully conditioned the bed is pressurized and placed on stream at 15° C. and 12 bar. The residence time of the cracked gas in the guard bed is 20 seconds. Before the run is started, the amount of mercury in the feed is about 34 ug/m$^3$. During 4 weeks of operation, the mercury concentration rises to 45 ug/m$^3$. At the start of the run, the outlet concentration of the mercury is sampled and is around 1.7 ug/m$^3$. Over a period of 4 weeks, the performance for mercury removal is monitored. At the end of the four weeks, the outlet concentration of mercury is about 20 ug/m$^3$. In other words, the initial mercury removal efficiency starts at about 95% (removing mercury from about 34 to about 1.7 ug/m$^3$) but the efficiency starts to decreases and drops to 50% after 4 weeks.

Example 4

A Composition to be Used in a Method According to the Present Invention

An alpha-alumina support material has a specific surface area of 0.84 m$^2$/g, total pore volume of 0.54 cc/g, and median pore diameter of 13.0 microns. It is in the shape of 5/16" hollow cylinders and has the following pore size distribution as measured by mercury porosimetry:

| Pore Diameter (microns) | Percent of pores (Vol %) |
|---|---|
| <0.1 | 1 |
| 0.1-0.5 | 6 |
| 0.5-1.0 | 18 |
| 1-10 | 23.5 |
| 10-100 | 43 |
| >100 | 8.5 |

Nitric acid leachable sodium of the support is 2534 ppm and nitric acid leachable potassium of the support is 1502 ppm. The surface acidity of the support material is set forth in Table 9. It is used to make a composition used in the method of the present invention.

The silver-amine-oxalate impregnation solution is obtained from the Union Carbide Corporation EO/EG catalyst unit of The Dow Chemical Company, which uses a standard recipe of 27.55 percent silver oxide, 18 percent oxalic acid, 17 percent ethylenediamine, 6 percent monoethanolamine, and 27 percent distilled water by weight, and a standard procedure to make the solution by (1) mixing 1.14 parts of ethylenediamine (high purity grade) with 1.75 parts of distilled water; (2) slowly adding 1.16 parts of oxalic acid dihydrate (reagent grade) to the aqueous ethylenediamine solution such that the temperature of the solution did not exceed 40° C., (3) slowly adding 1.98 parts of silver oxide, and (4) adding 0.40 parts of monoethanolamine (Fe and Cl free). The support material described in this Example 4 is vacuum impregnated with a silver-amine-oxalate impregnation solution as described above and then roasted at 500° C. in a flow of air at ambient pressure for 2.5 minutes to yield a silver-impregnated alpha-alumina support material (the composition) containing 17.10 weight percent silver.

Example 5A

According to the Present Invention

The composition of Example 4 is loaded in the same vessel and pretreated in the same way as the composition in Example 1 except that double the amount of composition is used to obtain a residence time of the cracked gas in the guard bed of 20 seconds. This time the performance of the bed is monitored for 18 months. During that time the mercury concentrations of the inlet and outlet are measured. Inlet concentrations of mercury up to 35 ug/m3 gas are found but mercury in the outlet remains below 0.05 ug/m$^3$. There is no indication of liquid in the bed or coming out of the bed. The inlet water concentration is measured and found to be less than 0.03 wt ppm. Water levels in the outlet are below 0.03 wt ppm. Analysis of the bed effluent fails to detect components like dimethylfulvene and oligomers of dimethylfulvene with cyclopentadiene although small amounts of dicyclopentadiene can be found at levels comparable to the inlet concentration. There is no observable change in the fouling rate of the downstream exchangers.

Example 5B

According to the Present Invention

Initially 1.0 grams of the composition according to Example 4 are loaded into a 0.5-inch diameter×8-inch long reactor. The material is pre-treated by a hydrogen flow of 100 ml/min at 200° C. for 1 hour. The tube is pressurized with cracked gas of the same composition described in Example 1 and then a flow of 1 L/min of the cracked gas is sent through the tube at a pressure of 12 bar. The tube is kept on stream for 68 days. The test material is retrieved from the tube and analyzed. The total mercury on the composition is 0.23% by weight. Analysis of the effluent while on stream and of the composition after the test does not show the presence of dimethylfulvene or oligomers of cyclopentadiene with dimethylfulvene.

Example 5C

Composition which could be Used in the Method of the Invention, but is Otherwise Tested Initially 1.0 grams of the composition according to Example 4 are loaded into a 0.5-inch diameter×1-inch long lab reactor. Mercury is added to a nitrogen flow via a U-shaped tube controlled at ambient temperature and 0.3 bar pressure, which results in a mercury concentration of 0.9 ug/L, in the inlet gas stream. About 350 ml of the mercury containing gas is flowed through the tube with the composition at ambient pressure and the performance of the bed is monitored. After 3 days, mercury is found in the outlet, after 6 days removal efficiency is 50%, and after 26 days the experiment is terminated when the mercury concentration in the outlet is more than 80% of the inlet. The total mercury on the composition is 0.35% by weight.

Table 9 summarizes the conditions and results of Examples 1, 2, 3, and 5A.

TABLE 9

| | Example | | | |
|---|---|---|---|---|
| Composition | 1 T2552A (comparative example, not according to the present invention) | 2 T2552A (comparative example, not according to the present invention) | 3 HGR (comparative example, not according to the present invention) | 5A According to the present invention |
| Wt % Ag | 6 | 6 | 0 | 17 |
| Silver metal area (m2/g per composition) | 4.5 | 4.5 | — | 0.46 |
| Silver dispersion (%) | 5.5 | 5.5 | — | 0.56 |
| Silver crystallite size (μ) | .0214 | .0214 | — | 0.211 |
| Support Surface Acidity (μmol/g) | 163.1 | 163.1 | — | 1.04 |
| Composition Surface Acidity (μmol/g) | 172.4 | 172.4 | — | 1.05 |
| Support Surface Area (BET) (m2/g) | 388 | 388 | — | 0.94 |
| Composition Surface Area (BET) (m2/g) | 252 | 252 | — | 1.05 |
| Support Total Pore Volume ($N_2$)(cc/g) | 0.43 | 0.43 | — | — |
| Composition Total Pore Volume ($N_2$)(cc/g) | 0.41 | 0.41 | — | — |
| Support Ave Pore Diameter ($N_2$)(μ) | 0.0044 | 0.0044 | — | — |
| Composition Ave Pore Diameter ($N_2$)(μ) | 0.007 | 0.007 | — | — |
| Support Total Pore Volume (Hg) (cc/g) | 0.297 | 0.297 | — | 0.54 |
| Composition Total Pore Volume (Hg) (cc/g) | 0.42 | 0.42 | — | 0.42 |
| Support Median Pore Diameter (Hg) (μ) | 0.012 | 0.012 | — | 11.0 |
| Composition Median Pore Diameter (Hg) (μ) | 0.009 | 0.009 | — | 15.6 |
| Hg conc Inlet (μg/$m^3$) | Up to 5 | 16 | About 40 | Up to 35 |
| Hg conc Outlet (μg/$m^3$) | <0.2 | <0.5 | After about 4 weeks About 20 | <0.05 |
| $H_2O$ conc inlet (wt ppm) | 0.1 | <0.03 | — | <0.03 |
| $H_2O$ conc Outlet (wt ppm) | 4-6 | <0.03 | — | <0.03 |
| Res time guardbed (sec) | 10 | 5 | 20 | 20 |
| Temp(° C.) | 15 | 15 | 15 | 15 |
| Pressure(bar) | 12 | 12 | 12 | 12 |

Example 6

Comparative Example, not According to the Present Invention

The support material of Example 4, without the addition of silver, is loaded, pre-treated, and tested in the same way as the absorbent composition in Example 5. The performance of the bed is monitored and shows no adsorption/absorption of mercury after being on stream for 30 minutes.

Example 7

According to the Present Invention

An additional batch of the support material of Example 4 is impregnated using the procedure described in Example 4, except that the stock solution of 27.55 percent silver is diluted to 9.67 percent. The resulting silver content of the composition is 6.43 percent by weight. The composition is loaded, pre-treated, and tested in the same way as the absorbent composition in Example 5B. The performance of the bed is monitored. After the test the total mercury on the composition is 0.14% by weight. Analysis of the effluent while on stream and of the composition after the test does not show the presence of dimethylfulvene or oligomers of cyclopentadiene with dimethylfulvene.

Example 8A

According to the Present Invention

A used ethylene oxide catalyst comprising a solid, porous, refractory support material in the shape of L=0.25"× OD=0.24" cylinders, having a specific surface area of approximately 1 $m^2/g$, total pore volume of 0.64 cc/g, median pore diameter 2.3 micron, and water leachable fluoride 83 ppm, having a surface acidity in the range of 0.1-10.0 μmole of irreversible $NH_3$/g of composition as measured by ammonia chemisorption, 29.5 wt % silver and one or more promoters, is loaded, pre-treated, and tested in the same way as the absorbent composition in Example 5B.

The performance of the bed is monitored. After the test the total mercury on the composition is 0.06% by weight. Analysis of the effluent while on stream and of the composition after the test does not show the presence of dimethylfulvene or oligomers of cyclopentadiene with dimethylfulvene.

Example 8B

Composition which could be Used in the Method of the Invention, but is Otherwise Tested A used ethylene oxide catalyst comprising a solid, porous, refractory support material in the shape of L=0.29"× OD=0.31" cylinders, acid leachable sodium of about 2278-2691 ppm and acid leachable potassium range of the supports is about 1260-1490 ppm. The surface areas of the supports range from 0.70 to 0.97 $m^2/g$, the total pore volume ranges from 0.52 to 0.55 cc/g, and the median pore diameter range is from 7.8 to 11.4. The pore size distribution of the supports when fresh is as follows:

| Pore Diameter (microns) | Percent of pores (Vol %) |
|---|---|
| <0.1 | 0.8-2.5 |
| 0.1-0.5 | 2.5-6.8 |
| 0.5-1.0 | 14.0-20.1 |
| 1-10 | 23.4-31.1 |
| 10-100 | 40.8-44.9 |
| >100 | 7.0-7.9 |

The silver range is 26.4 to 26.9 weight percent. The composition has a surface acidity in the range of 0.1-10.0 μmole of irreversible $NH_3$/g of composition as measured by ammonia chemisorption. The composition is tested in the same way as the composition in Example 5C. After the test, the total mercury on the composition is 0.05% by weight.

Example 9

Composition which could be Used in the Method of the Invention, but is Otherwise Tested Initially 5.0 grams of the composition according to Example 4 are loaded into a 0.5-inch diameter×8-inch long lab reactor. Mercury is added to a 400 cc/min (at standard conditions) nitrogen flow via a permeation tube controlled nominally at 90° C., which produces a mercury concentration of 1.7 μg/L, or 1700 ng/L, in the inlet gas stream. The gas is cooled to room temperature, or 25° C., before flowing across the bed at approximately atmospheric pressure. No measurable mercury is seen (limit of detection=1 ng/L) until 70 days. After 280 days the experiment is terminated. At the end of the experiment, the mercury concentration in the outlet (157 ng/L) is less than 10% of the inlet. The total mercury amount of mercury on the composition is 4.5% by weight.

Example 10

Composition which could be Used in the Method of the Invention, but is Otherwise Tested An alpha-alumina support material in the shape of L=0.35"×OD=0.35" cylinders, having a specific surface area of 1.04 $m^2/g$, total pore volume of 0.71 cc/g, median pore diameter 2.7 micron, surface acidity of 1.20 μmoles/g, and water leachable fluoride 32 ppm, is impregnated using the procedure described in Example 4, except that (a) the stock solution contains 27.05 percent silver, and (2) the resulting roasted material which contained 23.0% silver is impregnated for the second time using the procedure described in Example 4 except that the same stock solution contains 27.05 percent silver. The resulting silver content of the final composition is 36.85 percent by weight.

The composition is loaded, pre-treated, and tested in the same way as the composition in Example 5C. The performance of the bed is monitored and after 26 days the removal efficiency is 60%. Total mercury concentration on the composition is 0.47 wt %.

Example 11

Composition which could be Used in the Method of the Invention, but is Otherwise Tested An alpha-alumina support material in the shape of L=0.25"×OD=0.24" cylinders, having a specific surface area of 0.97 $m^2/g$, total pore volume of 0.62 cc/g, median pore diameter 2.5 micron, surface acidity of 6.7 μmoles/g, and water leachable fluoride 83 ppm is impregnated using the procedure described in Example 4, except that (a) the stock solution contains 27.05 percent silver, and (2) the resulting roasted material which contains 20.18% silver is impregnated for the second time using the procedure described in Example 4 except that the same stock solution contains 27.05 percent silver. The resulting silver content of the final composition is 33.33 percent by weight.

The composition is loaded, pre-treated, and tested in the same way as the composition in Example 5C. The performance of the bed is monitored and after 26 days the removal efficiency is 43% and the mercury concentration on the composition is 0.45%.

Example 12

Comparative Example, not According to the Present Invention

An alumina support material (SA-3177) in the shape of ⅛" pellets, obtained from Saint-Gobain NorPro Corporation (Akron, Ohio, USA) with reported phase composition of α/(transition γ, θ) and having a specific surface area of 116 $m^2/g$, total pore volume of 0.48 cc/g, median pore diameter of 94 angstroms, 0.1% $SiO_2$ is used in this example. The measured surface acidity of the support is 66.0 μmoles/g. This support is impregnated using the procedure described in Example 4, except that (a) the stock solution contains 27.05 percent silver. The resulting silver content of the composition is 13.83 percent by weight.

The composition is loaded, pre-treated, and tested in the same way as the composition in Example 5C. The performance of the bed is monitored and after 26 days the mercury removal efficiency is 100%. The mercury concentration on the composition is 0.70 wt %.

Example 13

Composition which could be Used in the Method of the Invention, but is Otherwise Tested An alpha-alumina support material (SA-51161) in the shape of 1/16" pellets, obtained from Saint-Gobain NorPro Corporation (Akron, Ohio) with reported specific surface area of 4.88 $m^2/g$, total pore volume of 0.38 cc/g, median pore diameter of 0.4 microns, 1% $SiO_2$ is used in this example. The measured surface acidity of the support is 2.14 μmoles/g. This support is impregnated using the procedure described in Example 4, except that the stock solution contains 27.05 percent silver. The resulting silver content of the composition is 12.44 percent by weight.

The composition is loaded, pre-treated, and tested in the same way as the composition in Example 5C. The performance of the bed is monitored and after 26 days the mercury removal efficiency is 15%. The mercury concentration on the composition is 0.44 wt %.

Example 14

Composition which could be Used in the Method of the Invention, but is Otherwise Tested An alpha-alumina support material (SA-52124) in the shape of 3.2 mm spheres, obtained from Saint-Gobain NorPro Corporation (Akron, Ohio) with reported specific surface area of 5.6 $m^2/g$, total pore volume of 0.39 cc/g, median pore diameter of 0.17 microns, <0.1% $SiO_2$ is used in this example. The measured surface acidity of the support is 2.63 μmoles/g. This support is impregnated using the procedure described in Example 4, except that the stock solution contains 27.05 percent silver. The resulting silver content of the composition is 13.38 percent by weight.

The composition is loaded, pre-treated, and tested in the same way as the composition in Example 5C. The performance of the bed is monitored and after 26 days the mercury removal efficiency is 57%. The mercury concentration of the composition is 0.76 wt %.

Example 15

Composition which could be Used in the Method of the Invention, but is Otherwise Tested A composition is prepared by impregnating an alpha-alumina support material in the shape of L=0.29"×OD=0.31" hollow cylinders, having a surface acidity in the range of 0.1-10.0 μmole/g, nitric acid leachable sodium of 2223 ppm and nitric acid leachable potassium of 1373 ppm, specific surface area of 0.78 $m^2/g$, total pore volume of 0.53 cc/g, median pore diameter 10.8 micron, with following pore size distribution as measured by mercury porosimetry,

| Pore Diameter (microns) | Percent of pores (Vol %) |
| --- | --- |
| <0.1 | 0 |
| 0.1-0.5 | 1.8 |
| 0.5-1.0 | 17.8 |
| 1-10 | 29.6 |
| 10-100 | 44.5 |
| >100 | 6.4 |

according to method described in Example 11, except that a different stock solution is used and appropriate amounts of sodium sulfate and cesium sulfate are added to the stock solution during the second impregnation which results in final composition of 26.81 percent silver, 540 ppm cesium, 280 ppm sodium, and 780 ppm sulfate. A sample of this composition, which is also a catalyst for the production of ethylene oxide, is loaded, pre-treated, and tested in the same way as the absorbent composition in Example 5C. The performance of the bed is monitored and after 26 days the mercury removal efficiency is 18%. The mercury concentration on the composition is 0.43%.

Example 16

According to the Invention

A cesium promoted ethylene oxide catalyst with about 18 weight percent silver in the form of 1 micron particles on alpha-alumina having a BET surface area of about 0.25 $m^2/g$ (the catalyst particles are fractured to decrease the diameter from 5 mm to 1-2 mm in order to achieve better reactor loading) is tested for its capability to remove mercury from a liquid hydrocarbon stream. In this example, the liquid hydrocarbon stream is n-hexane containing about 0.8 ppm prior to feeding to the catalyst bed. This level of mercury is reached by contacting finely divided hexane with mercury.

The mercury in n-hexane is determined starting with an extraction with $H_2SO_4$ diluted $KMnO_4$ solution. After discoloration of the residual permanganate with hydroxylammonium hydrochloride, the formed $Hg^{2+}$ is reduced by $NaBH_4$ to metallic Hg with a Perkin Elmer MHS-10 system. The metallic Hg is transported to Ag wool. The formed amalgam is decomposed at about 700K and the evolved Hg is swept out of the solution in the reaction vessel and determined with an Atomic Absorption Spectrometer equipped with an Electronic Discharge Lamp. The mercury absorbed by the tested material is determined by extraction with HCl:$HNO_3$ (3:1) mixture followed by measuring of the mercury with a Jobin Yvon JY-38 Ionic Coupled Plasma Atomic Emission Spectrometer ("ICP-AES").

The experiment is conducted using an apparatus as outlined in FIG. 3 (pump not depicted, tubes not numbered). All containers and vessels are made of glass, connections were made of Teflon tubing and short lengths of silicone rubber tubing. One hundred grams of the catalyst is used.

N-hexane flows from tank (10) to tank (11) where the n-hexane is saturated with mercury (12). A sample is taken of the n-hexane saturated with mercury from a first (or feed) sample point (13), before the n-hexane saturated with mercury passes through the catalyst bed (14). The flow of the feed into the catalyst bed is about 50 ml/minute. After passing through the catalyst bed, the n-hexane stream passes tested at the second (or effluent) sample point (15). The sample measurements are performed at ambient temperature and 0.1 MPa.

The catalyst is tested for its mercury removal ability without any chemical pretreatment.

The results of the testing show that mercury is removed from the liquid hydrocarbon stream by the catalyst. The adsorption of mercury is not complete. The lack of complete adsorption was ascribed to kinetic limitations.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon the foregoing description. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method of removing mercury from a gas hydrocarbon stream from a hydrocarbon cracker and the stream comprises mercury and further comprises olefins, oxygenated by-products, dienes, and hydrocarbons other than dienes, the method comprising: contacting the stream with a composition comprising:

(a) a solid, porous, refractory support material having a surface acidity in the range of 0.1-10.0 μmole of irreversible $NH_3$/g of support as measured by ammonia chemisorption, wherein the support material has a surface area of at least about 0.1 $m^2$/g and up to about 1.6 $m^2$/g and wherein the support material comprises at least about 80% by weight alpha-alumina; and (b) silver in the form of reduced silver.

2. The method of claim 1, wherein the composition has a surface acidity in the range of 0.1-10.0 μmole of irreversible $NH_3$/g of composition as measured by ammonia chemisorption.

3. The method of claim 1, wherein the composition has a surface acidity sufficient to reduce polymer and/or oligomer formation from dienes in the stream as compared to an composition with a surface acidity greater than 10.0 μmole of irreversible $NH_3$/g of composition as measured by ammonia chemisorption.

4. The method of claim 1, wherein the composition has a surface acidity sufficient to reduce water formation from a condensation reactions of oxygenated by-products in the stream as compared to a composition with a surface acidity greater than 10.0 μmole of irreversible $NH_3$/g of composition as measured by ammonia chemisorption.

5. The method of claim 1, wherein the composition has a surface acidity sufficient to reduce oligomer formation from a reaction of oxygenated by-products in the stream as compared to an composition with a surface acidity greater than 10.0 μmole of irreversible $NH_3$/g of composition as measured by ammonia chemisorption.

6. The method of claim 1, wherein the dienes comprise butadiene and cyclopentadiene and the hydrocarbons other than dienes in the stream comprise methane, and the olefins comprise ethylene and propylene.

7. The method of claim 1, wherein the composition comprises a catalyst which is capable of being used or has been used to produce ethylene oxide, the catalyst comprising, silver and one or more promoters, and optionally wherein at least some of the one or more promoters has been removed.

8. The method of claim 1, wherein the support material has a pore volume of at least about 0.2 cc/g, wherein at least about 40% of pore volume is present in pores between about 10 and 100 microns in diameter as measured by mercury porosimetry and wherein the composition comprises silver in the amount of at least about 1 and less than about 70 wt. percent.

9. The method of claim 1 wherein the silver is regenerated by the removal of mercury.

* * * * *

UNITED STATES PATENT AND TRADEMARK OFFICE

CERTIFICATE OF CORRECTION

PATENT NO. : 8,382,881 B2
APPLICATION NO. : 12/446529
DATED : February 26, 2013
INVENTOR(S) : Bhasin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 897 days.

Signed and Sealed this
First Day of September, 2015

Michelle K. Lee

Michelle K. Lee
*Director of the United States Patent and Trademark Office*